United States Patent [19]

Spitz et al.

[11] 3,880,112

[45] Apr. 29, 1975

[54] DEVICE FOR THE PREPARATION OF THIN FILMS

[75] Inventors: Jean Spitz, Gieres; Jean-Claude Viguie, Grenoble, both of France

[73] Assignee: Commissariat a l'Energie Atomique, Paris, France

[22] Filed: Apr. 17, 1973

[21] Appl. No.: 352,086

Related U.S. Application Data

[62] Division of Ser. No. 190,706, Oct. 20, 1971, Pat. No. 3,840,391.

[52] U.S. Cl. .......... 118/8; 118/48

[51] Int. Cl. .......... C23c 13/12

[58] Field of Search .......... 118/7, 8, 48–49.5; 117/DIG. 8, 106–107.2, 227; 356/37, 38

[56] References Cited

UNITED STATES PATENTS

| | | | |
|---|---|---|---|
| 2,763,581 | 9/1956 | Freedman | 118/49.1 UX |
| 3,211,583 | 10/1965 | Riley | 117/107.2 R |
| 3,694,085 | 9/1972 | Rich | 356/37 |
| 3,735,727 | 5/1973 | Sussmann | 118/48 |

OTHER PUBLICATIONS

Applied Optics, "Theoretical and Experimental Aspect of the Productions of Aerosols For Use in Atomic Absorption Spectroscopy," Stupar et al., Vol. 7, No. 7, (July 1968), pp. 1351–1358.

*Primary Examiner*—Morris Kaplan
*Attorney, Agent, or Firm*—Cameron, Kerkham, Sutton, Stowell & Stowell

[57] ABSTRACT

Thin films of metal, metallic compounds or other materials are prepared by ultrasonic atomization of a solution which is intended to form the material to be deposited, the aerosol which is thus produced being transported by a carrier gas and deposited on a heated substrate.

3 Claims, 6 Drawing Figures

DEVICE FOR THE PREPARATION OF THIN FILMS

This is a division of application Ser. No. 190,706 filed Oct. 20, 1971, now U.S. Pat. No. 3,840,391.

This invention relates to a device for preparing thin films of metals or metallic compounds by depositing on a heated substrate a mist of solution which forms the material to be deposited, the mist being transported towards the substrate by a carrier gas. The invention also relates to the improved thin films which are obtained by application of the method.

Up to the present time, the practice which has usually been adopted for the preparation of thin films in accordance with the method defined above has consisted in atomizing the solution of material to be deposited by compressed-air spraying. However, this particular technique is attended by a number of disadvantages. In the first place, the mists or aerosols which are obtained are not homogeneous or, in other words, the droplets have a broad sizedistribution spectrum. In point of fact, as will be explained hereinafter, an unduly high proportion of droplets which are either too far below or too far above the optimum size results in unsatisfactory films, in the former case because the film does not adhere to the substrate and in the latter case because the thickness of the film is not uniform. In the second place, the only available parameter for modifying the characteristics of the mist (size of droplets and flow rate of aerosol) in a given apparatus is the flow rate of the carrier gas which is in turn dependent on the pressure of admission of said gas. In point of fact, it would prove desirable in many instances to modify the value of only one of the foregoing characteristics without thereby modifying the value of the other since any general control is at best a mere compromise.

The chief aim of the invention is to provide a method of preparation of thin films which largely overcomes the disadvantages attached to methods of the prior art. To this end, the invention proposes a method whereby the solution employed for forming the material to be deposited is atomized by ultrasonic waves.

The large number of advantages which accrue from the replacement of compressed-air atomization by ultrasonic atomization are closely linked with the particular application which is contemplated : the size distribution is limited to a very narrow range in the vicinity of the maximum value, thereby ensuring higher quality of films. The corollary to this is that the efficiency is greatly enhanced since practically the entire quantity of formed droplets is entrained by the carrier gas whereas in the case of the compressed-air spraying process, droplets representing a very high proportion (often higher than 80 %) are too large to permit entrainment by the carrier gas. These droplets are deposited on the walls of the atomization chamber. There is a complete separation of functions between the carrier gas and the ultrasonic generator inasmuch as the gas serves only to entrain the aerosol which has already formed. It is thus possible to modify the supply of aerosols by acting on the flow rate of the carrier gas and to modify two parameters by acting on two separate and distinct properties of the ultrasonic generator which have practically independent functions: the mean size of the droplets is dependent on the frequency, the emission from the solution is dependent on the ultrasonic power.

In short, an improvement is achieved both in the quality of the aerosol (by narrowing the size distribution spectrum of the droplets) and in the flexibility of use of the system. In consequence, it is always much easier to operate under optimum conditions. Moreover, the aerosol exhibits properties which are extremely close to those of a homogeneous gas, thereby facilitating transport of the aerosol from the formation zone to the deposition zone.

The apparatus according to the invention is primarily although not exclusively applicable to the preparation of thin oxide films which may be employed as photomasks in micro-electronics, of thin films of sulphides and garnets as well as thin coatings of metals or metallic compounds (for example aluminum on a metallic or plastic substrate; nickel, chromium, cobalt, platinum, palladium, osmium, iridium on a suitable substrate for forming catalysts; and so forth).

The invention will now be described by way of example with reference to the accompanying drawings, wherein.

Figure 1:
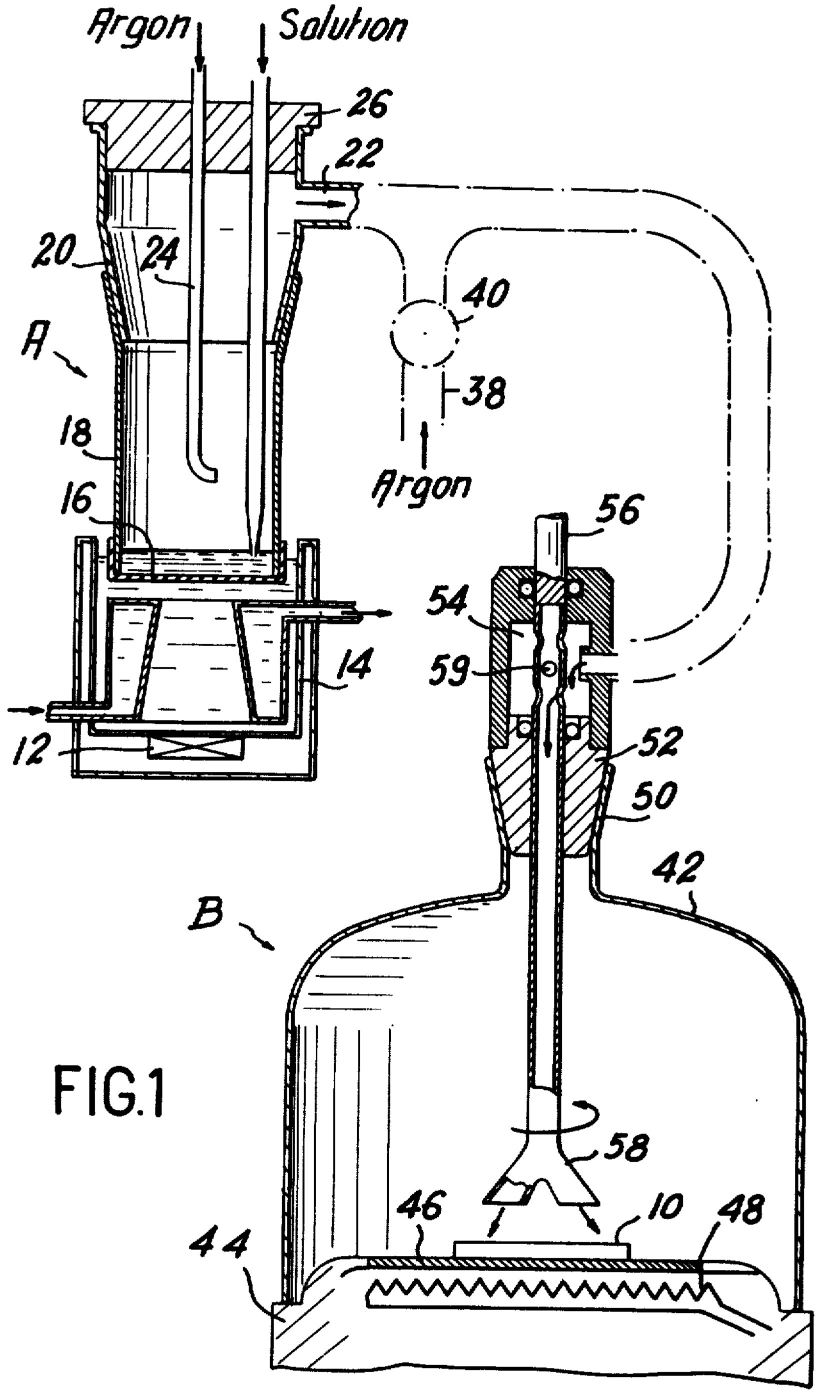
FIG. 1 shows diagrammatically an installation for the formation of thin films on a flat substrate of large size, the aerosol generator and the chamber in which the deposition is carried out being shown in cross-section along a vertical plane.

The device which is illustrated in FIG. 1 can be considered as being made up of an aerosol generator A, a deposition chamber B and ancillary elements. Said device is intended to form thin films on glass plates 10 having substantial dimensions (e.g. square plates 50 × 50 mm in size).

The aerosol generator A has a general structure which is known per se and a complete description of said generator can be found in the article by J. Spitz and J. Uny entitled "Ultrasonic spraying applied to atomic absorption spectrometry" and published in the July, 1968 issue of "Applied Optics", pages 1345 to 1349. This generator comprises an ultrasonic-wave emitter 12 which is placed on the underside of an annular tank 14 containing an ultrasonicwave transmitting liquid. A diaphram 16 closes-off a spray atomization chamber 18. The chamber 18 is constituted by a cylindrical tube provided at the top with a conical end portion in which is inserted a head 20. The head carries a duct 22 through which the aerosols are discharged. The carrier gas which may consist, for example, of argon or of another inert or oxidizing gas in the case of oxide deposition is introduced into the chamber 18 through a vertical tube 24 which is placed in the axis of the tube and passes through a stopper 26 which is inserted in the head 20. The chamber 18 is fitted with a device (not shown) for the automatic supply of solution of material to be deposited.

Figure 2:
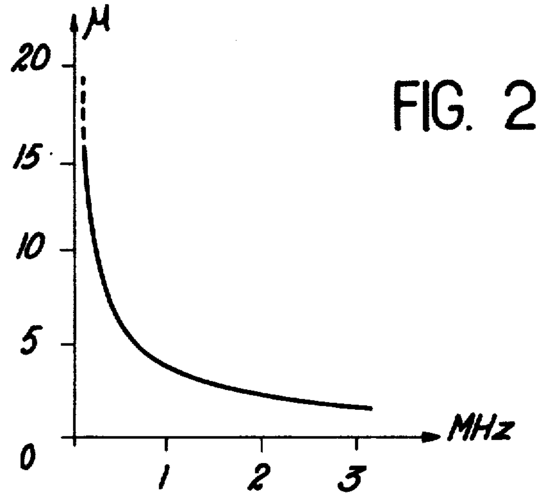
FIG. 2 is a curve representing the mean diameter of the droplets as a function of the frequency of the ultrasonic generator.

The piezoelectric generator 12 is advantageously of a type which provides for power variation between 0 and 100 W, for example. A frequency of the order of 1 megacycle is usually suitable and makes it possible to obtain a mean particle size of a few microns. Tests carried out with a generator of the type illustrated in FIG. 1 and using various frequencies have shown that the droplets obtained had a mean diameter which was a decreasing function of the frequency, as shown in FIG. 2. Moreover, these tests have demonstrated the fact that the size spectrum always remains much narrower than in the case of the compressed-air spraying technique. By way of example, it can be mentioned that, in the case of a frequency of 3 megacycles, 50 % of the atomized volume had a diameter between 2 and 3 microns whilst 27 % had a volume between 1.5 and 2 microns. The volume atomized in the form of droplets having a size less than 1.5 microns was practically negligible.

The advantage of this homogeneity is quite clear if the mechanism of the deposition process is borne in mind: when a droplet of a solution containing a metallic salt moves towards a heated substrate, said droplet vaporizes and liberates the metallic salt in fused form and then in the form of vapor. The salt which is highly reactive usually reacts on the actual surface of the substrate since energy transfers are more readily carried out at this point, whereupon a thin film is formed. However, if the droplet is too small, vaporization takes place too soon (that is to say at a distance from the substrate), the reaction is in homogeneous phase and the solid substance which results does not adhere strongly on the substrate. Conversely, if vaporization takes place too late, the droplet is flattened against the substrate and the accumulations of the deposit at the point of impacts are detrimental to the quality of the film.

It is therefore apparent that all the drops of an aerosol must essentially have the same behavior at a given distance from the substrate and that the dimensions of said drops should accordingly be maintained within a very narrow range.

In some cases, it is an advantage to be able to adjust the concentration of aerosols in the carrier gas without acting on the flow rate of gas above the solution which is subjected to the action of the ultrasonic generator since said flow rate must remain of low value in order to prevent "impaction" of the mist which is formed. In order to ensure compatibility of these two requirements, it is only necessary to provide the duct 22 with a branch pipe 38 for the supply of argon, said pipe being fitted with a flowregulating valve 40. It should be noted in this connection that the very uniform aerosol which is delivered by the device A can be transported by a gas flow at a very low rate and at a pressure in the vicinity of atmospheric, with the result that the air stream which is directed towards the substrate has a low rate of flow and accordingly cools this latter to a lesser extent.

The deposition chamber which is illustrated in FIG. 1 comprises a bell-housing 42 which rests on a base 44. Said base is fitted with a plate 46 which carries the substrate 10 and is heated by a resistor 48. A motor which is not illustrated serves to displace the substrate over the plate at a low and uniform speed in order to increase the homogeneity of the film. A bell-housing having a diameter of 200 mm and a height of 150 mm has made it possible to treat glass plates measuring 50 × 50 mm. The bell-housing is provided at the top with a necked portion 50 which is closed by a head 52 and this latter delimits a chamber 54 into which opens the duct 22. The aerosol is distributed above the plate 10 by means of a hollow rod 56 fitted with a nozzle 58 for distribution towards a number of zones of the substrate. The aerosol penetrates into the rod through openings 59. The rod 56 is driven in rotation in order to deliver the aerosol successively over a number of different portions of the substrate 10 and in order to prevent abrupt and general cooling of this latter. In the particular example of preparation of $Fe_2O_3$ films which can be considered as representative, the temperature of the substrate which was initially of the order of 490°C cannot be caused to vary to a greater extent than a few tens of degrees, this result being achieved by virtue of the rotary motion of the rod.

The low flow rate of carrier gas which is permitted by the uniformity of the aerosol makes it possible to operate at higher temperatures than in devices of the prior art which make use of the compressed-air atomization technique.

There will now be described by way of example the formation of thin films of ferric oxide which can be employed as photo-masks. Up to the present time, the majority of photo-masks which were employed in the fabrication of integrated electronic circuits were made of chromium. However, chromium masks are opaque to visible light, with the result that relative positioning of the different masks is a difficult operation. On the contrary, the ferric oxide films which are obtained by application of the method according to the invention are transparent in the visible region of the spectrum so that it is possible to position them accurately and to reduce manufacturing rejects.

Figure 3:
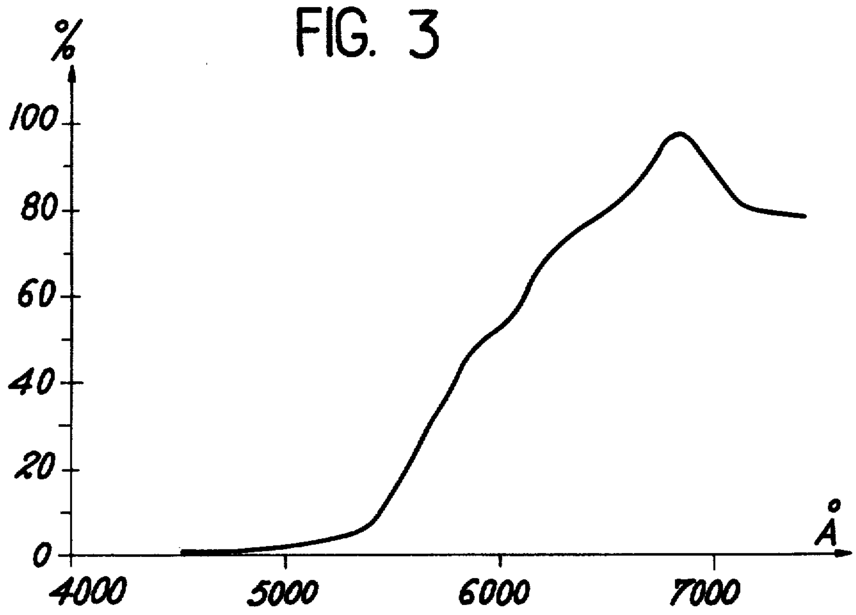
FIG. 3 is a curve representing the coefficient of transmission of a thin film of iron oxide $Fe_2O_3$ as obtained by means of the device of FIG. 1 and having a thickness of 2000 A, as a function of the wavelength of light.

The tests which have been carried out with a generator having an output frequency of 1 Mc/s acting on an aqueous solution of ferric chloride $FeCl_3$ having a concentration of 0.4 mole/liter in an argon stream flowing at a rate of 6 l/min and at a pressure which is very close to atmospheric have made it possible to form thin films of this type on a substrate which was maintained at a minimum temperature of 450°C. The crystallites obtained are very small since their dimensions are of the order of 2000 A and are extremely uniform. The photomasks which are thus produced achieve perfect compliance with the conditions laid down, that is to say good transmission of light in the visible region of the spectrum and low transmission in the ultraviolet region below 4000 A, as shown in FIG. 3. Since the crystallites are extremely small, chemical etching can be highly accurate. Finally, hardness and resistance to abrasion are very high. It should be noted in this connection that the size of the crystallites obtained by means of the compressed-air spraying process remains of the order of one micron. The technical advance which has been made is therefore of considerable significance. Instead of ferric chloride in water, use can be made of a ferric organic salt in solution in a volatile solvent which can be organic in order to be destroyed at the time of formation, for example by combustion in the oxidizing carrier gas.

Figure 4:
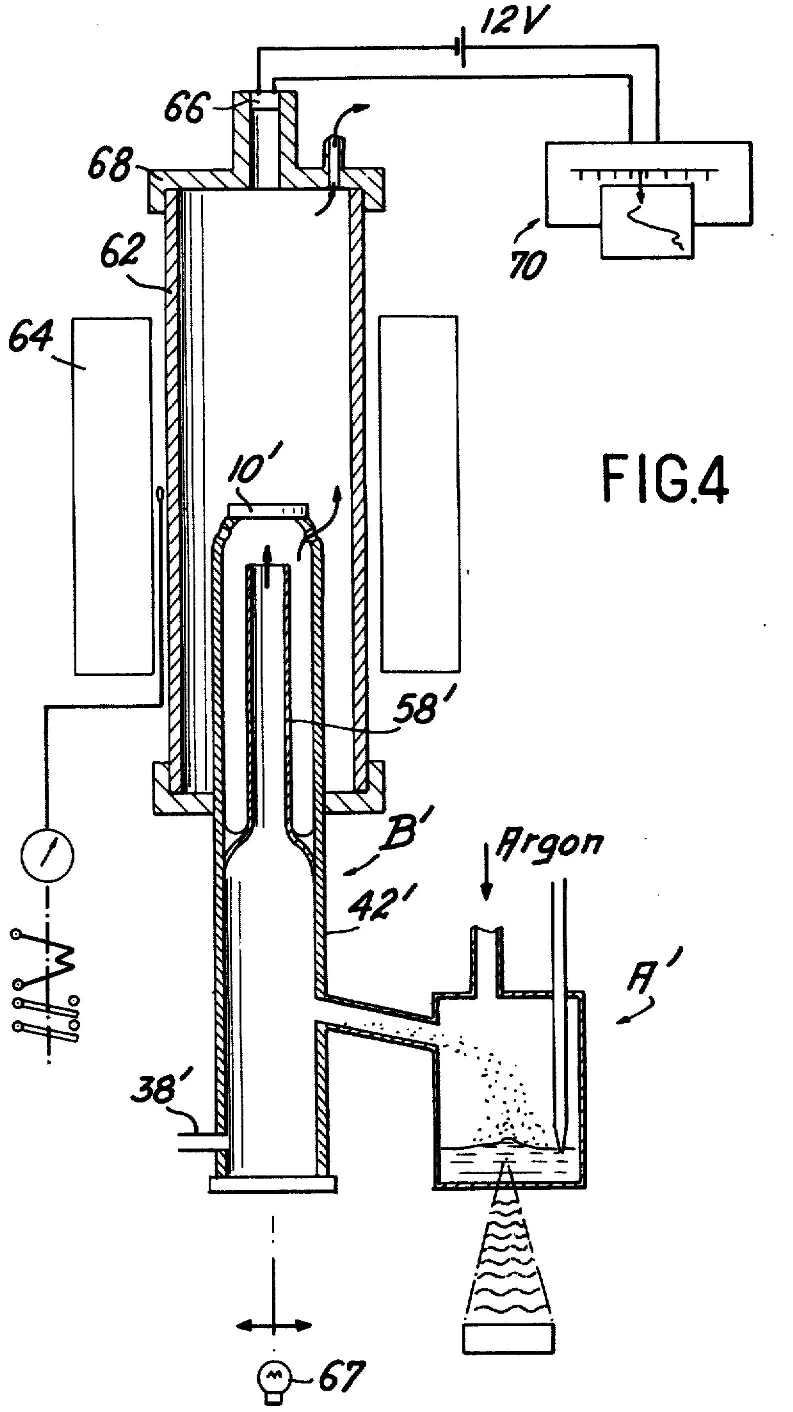
FIG. 4 shows an alternative form of construction of the device of FIG. 1 for forming deposits on substrates having small dimensions, the aerosol generator being shown only by way of schematic illustration.

The device which is illustrated in FIG. 4 constitutes an alternative embodiment of the invention which is intended for the formation of garnets in a thin film on substrates having smaller dimensions than in the previous example, the substrates being made up of quartz plates measuring 15 × 15 mm at a temperature which is higher than in the previous example and which can attain 800°C.

The aerosol generator A' is connected by a short length of piping to the chamber B'. Said chamber is constituted by a tube which is provided at the lower end with an additional argon inlet 38' and in which is placed a nozzle 58' for directing the aerosol onto the substrate 10'. The top portion of the tube 42' is placed within a sleeve 62, said sleeve being in turn placed within an electric resistance-type tubular furnace 64. Growth of the film is indicated by a recorder 70 which is connected to a photoresistive cell 66, said cell being placed in an end-piece 68 which closes the sleeve and being illuminated by a light source 67. The temperature of the substrate 10' is measured by a thermocouple (not shown) which controls a regulating device for maintaining the substrate at a suitable temperature.

In this embodiment, vaporization is carried out slowly as the carrier gas loaded with droplets progresses within the nozzle 58'.

Figure 5:
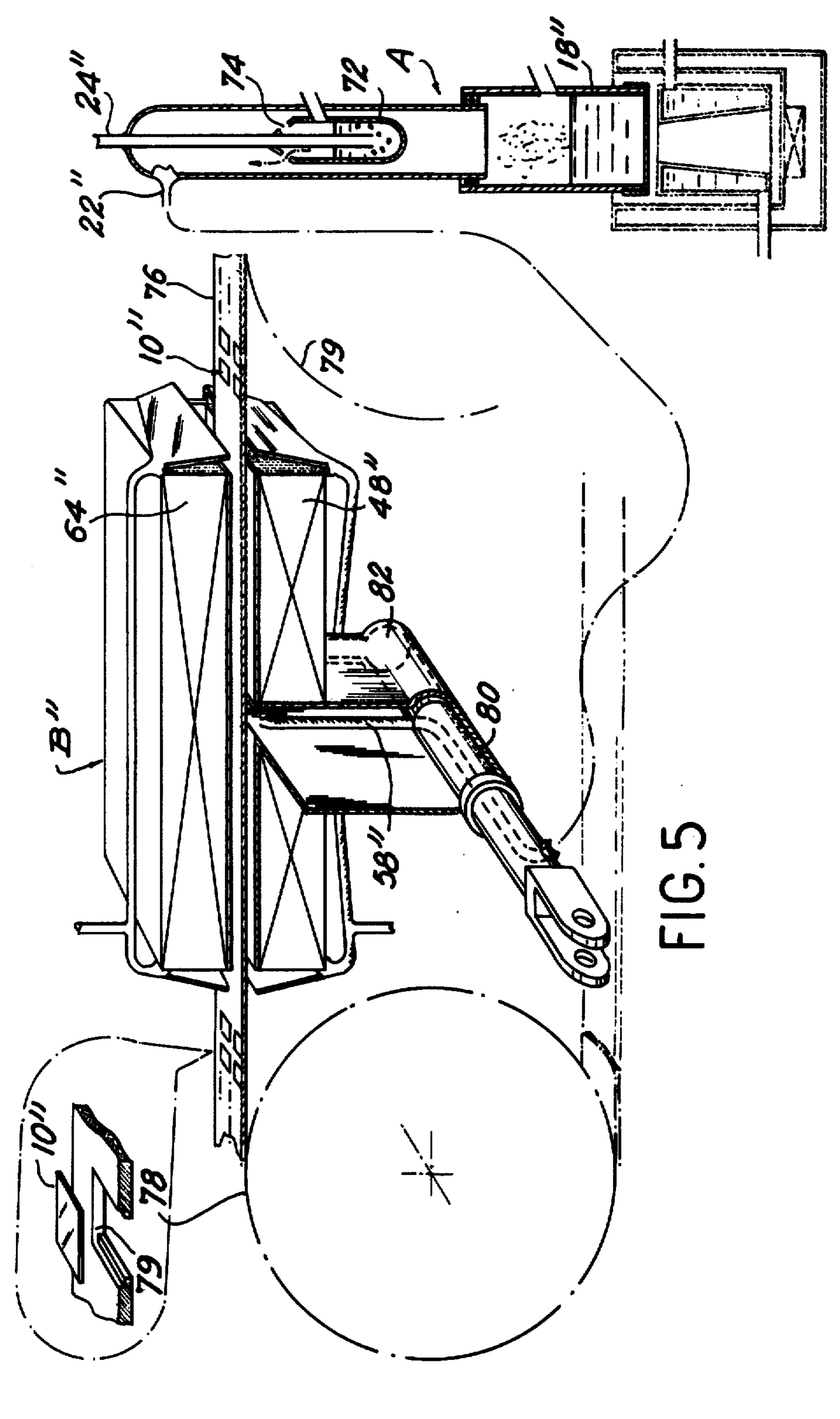
FIG. 5 shows another alternative form of construction which is intended for continuous or semi-continuous operation.

The device which is illustrated in FIG. 5 differs from the preceding in that it is designed for either continuous or semi-continuous operation. The aerosol generator A'' is very similar to the generator shown in FIG. 1 but the vertical tube 24'' extends into a bubbling flask 72 which also contains the addition solution. The gas is saturated with solvent in said flask and passes out of this latter through apertures 74, then entrains the mist which was formed in the chamber 18'' towards a discharge pipe 22''.

The deposition chamber B'' has a generally flat shape and is provided with two slits in its opposite faces. An endless strip 76 which is driven and guided by two pulleys 78 as shown very diagrammatically in FIG. 5 passes into the chamber and out of this latter through said slits. Recesses 78, one of which is shown on a large scale on the top lefthand side of FIG. 5, are formed in the strip 76. Each recess is intended to receive a substrate 10'' on which a thin film is to be deposited.

Figure 6:
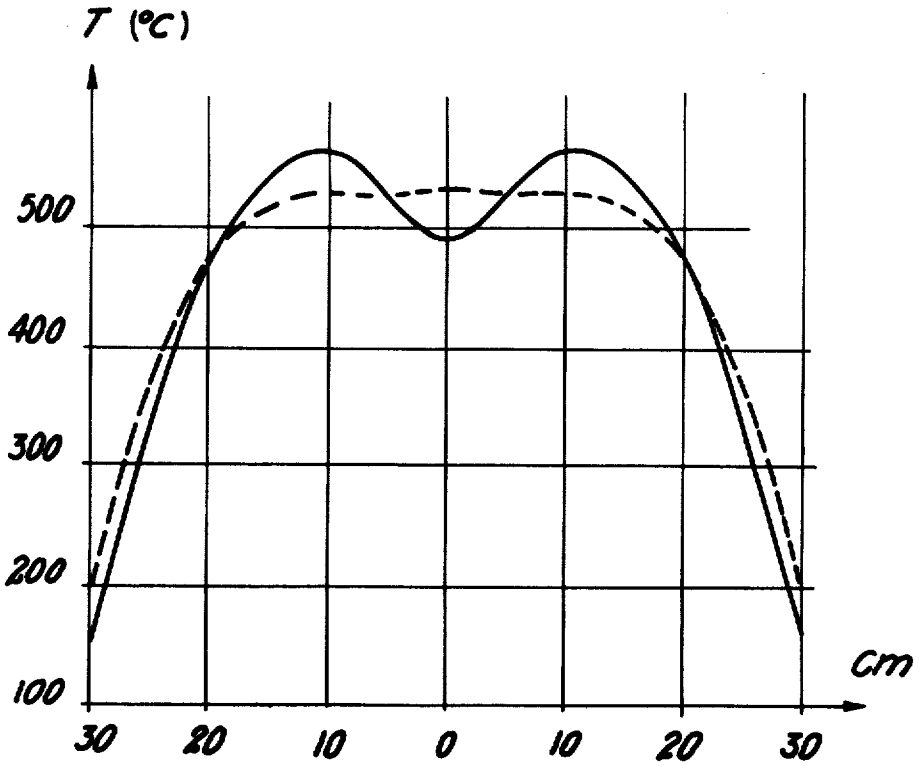
FIG. 6 shows the curve of variation of temperature along the furnace of FIG. 5 when the loaded gas is admitted (full-line curve) and when no gas is present (dashed-line curve).

Two sets of resistors constituting a furnace 64'' are placed within the deposition chamber on each side of the path of the endless strip 76. The temperature distribution within said furnace advantageously comprises two lateral portions which permit rapid variation and are as small in length as possible and a central portion having a substantially constant temperature. However, it is usually sufficient in practice to have a curve of variation of the type illustrated in FIG. 6 with a minimum value at the center which is not very pronounced and results from the injection of gas.

The nozzle 58'' could be flat and perpendicular to the direction of displacement of the endless strip 76 but it is usually an advantage to ensure that said nozzle has a generally cylindrical shape and is driven in a reciprocating movement of translation at right angles to the direction of displacement of the strip. In FIG. 5, the nozzle is carried by the plunger 80 and this latter is slidably mounted within a cylinder 82 which is carried by an extension of the chamber B''. The plunger is coupled to a motor (not shown) and endowed by this latter with the necessary reciprocating motion.

The invention is clearly not limited solely to the embodiments which have been illustrated and described by way of example but extends to all alternative forms, and in particular the application to deposits which are not limited solely to metallic constituents.

What we claim is:

1. A device for the preparation of a thin film of metal or of a metallic compound comprising an aerosol generator, a deposition chamber, means in said chamber for heating a substrate and means for circulating a carrier gas from said generator to said chamber, means for controlling the flow rate of said carrier gas, wherein said generator comprises an ultrasonic wave emitter acting on a solution forming droplets of the material to be deposited on the substrate in said chamber to atomize said solution means for controlling the power of the ultrasonic wave and means for controlling the frequency of the ultrasonic wave, the quantity of the aerosol being regulated by the power of the ultrasonic wave, the size of the droplets being regulated by the ultrasonic frequency and the quantity of aerosol being regulated by the flow rate of carrier gas.

2. A device according to claim 1 including means for carrying out a displacement of the substrate at a uniform rate during deposition.

3. A device according to claim 1 said deposition chamber including a nozzle and means for displacing the nozzle on a closed path during which said nozzle directs a jet of carrier gas loaded with aerosols towards different zones of the substrate.

* * * * *